June 13, 1933.  T. C. CROSSMAN  1,913,625
BRAKE RIGGING
Filed July 2, 1932   2 Sheets-Sheet 1
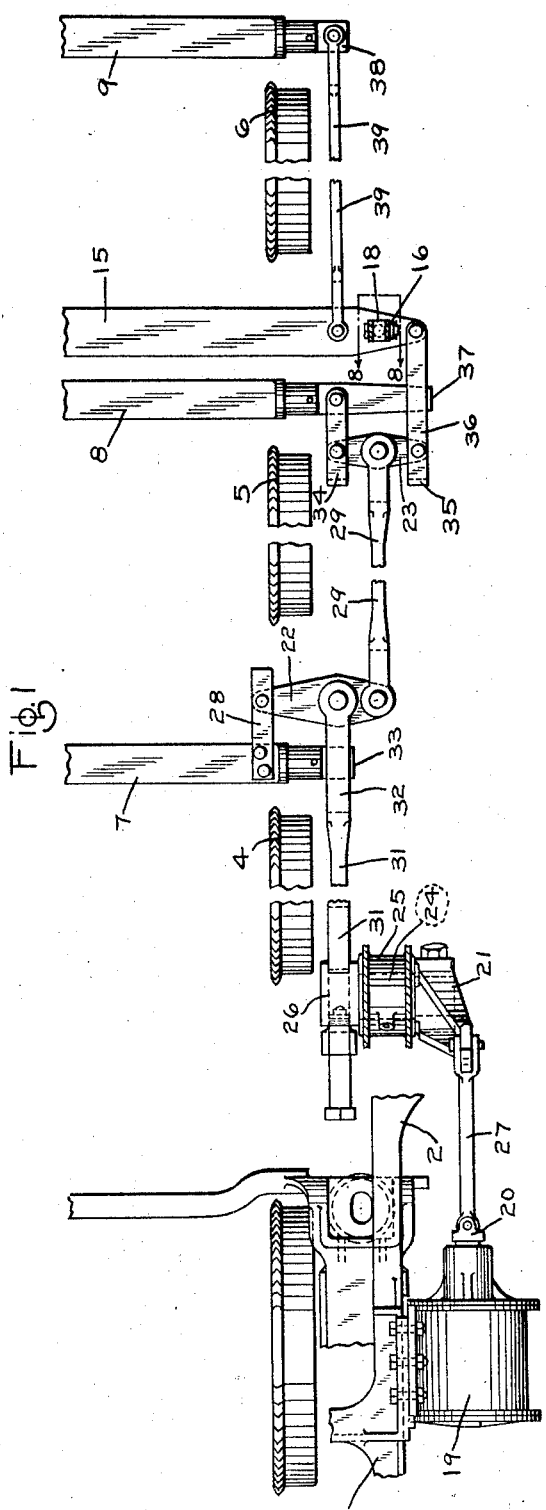
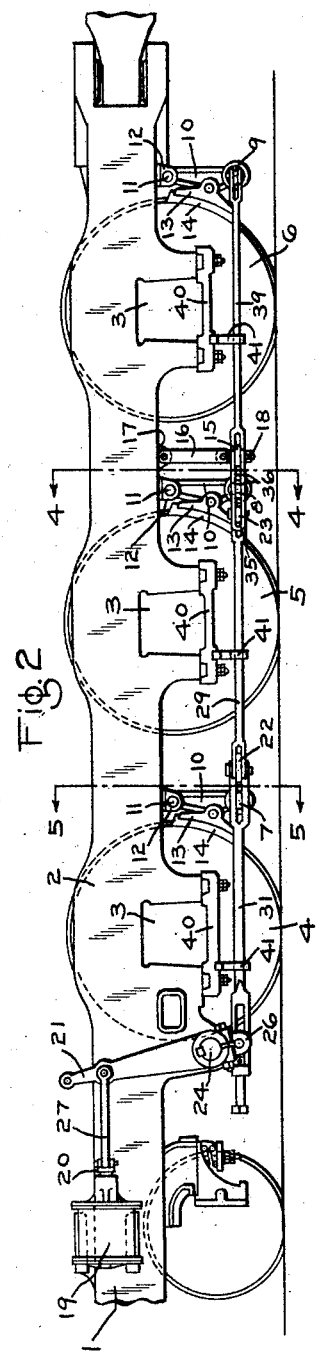
INVENTOR.
THEODORE C. CROSSMAN
BY Wm. M. Cady
ATTORNEY.

June 13, 1933.  T. C. CROSSMAN  1,913,625
BRAKE RIGGING
Filed July 2, 1932   2 Sheets-Sheet 2
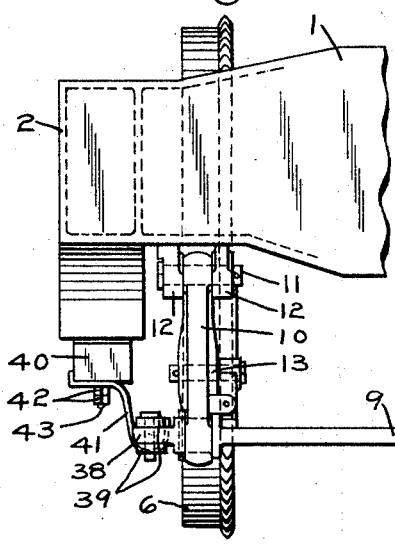
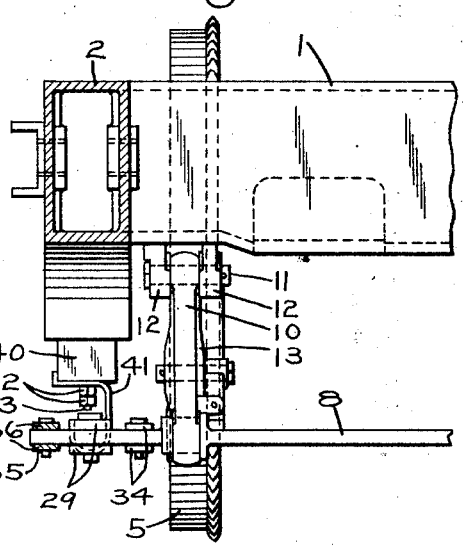
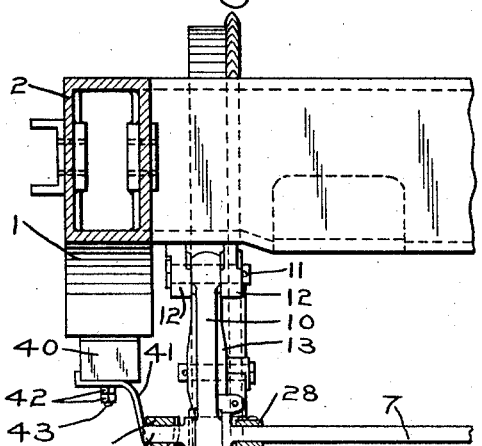
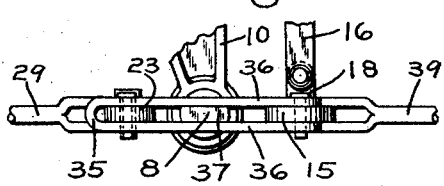
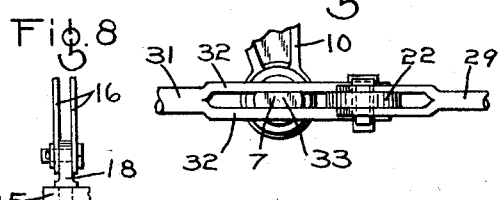
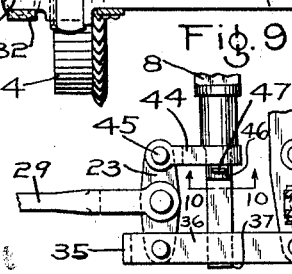
INVENTOR.
THEODORE C. CROSSMAN
BY Wm. M. Cady
ATTORNEY.

Patented June 13, 1933

1,913,625

UNITED STATES PATENT OFFICE

THEODORE C. CROSSMAN, OF ST. LOUIS, MISSOURI, ASSIGNOR TO THE AMERICAN BRAKE COMPANY, OF ST. LOUIS, MISSOURI, A CORPORATION OF MISSOURI

BRAKE RIGGING

Application filed July 2, 1932. Serial No. 620,561.

This invention relates to brake rigging for railway rolling stock and more particularly to brake rigging for locomotives or car trucks.

In some railway vehicles, especially in electric locomotives, the spaced, longitudinally extending side members of the locomotive frame and the usual longitudinally extending system of brake levers and rods of the brake rigging, are located between the locomotive wheels, that is to say, the side member and brake rigging at each side of the locomotive are behind the wheels. Another arrangement has been proposed in which the side members are located outside of the wheels and in which the brake rigging is located between the wheels and is supported from the usual transversely extending frame members connected with the longitudinally extending side frame members. It has been found to be very difficult, especially in electric locomotives, to position the brake rigging between the wheels in such a manner as to provide sufficient clearance to permit the proper movement of the brake parts without interfering with other engine parts.

Another objectionable feature of locating the brake rigging between the wheels, is that the accessibility to the brake parts for inspection and repair is very difficult. A further objectionable feature of this arrangement is that the several brake rods and levers of the equipment interfere with the easy access to the motors or other parts of the vehicle located near the brake rigging.

The principal object of my invention is to provide a brake rigging for railway rolling stock which will be free of the above mentioned objectionable features.

This object I attain by positioning the several operatively connected brake levers and rods of the rigging outwardly from the outer sides of the wheels of the vehicle, where said levers and rods, as well as the associated brake parts, are readily accessible for inspection and repair and where they will not interfere with the inspection or repair of other parts of the vehicle.

Another object of the invention is to provide novel means for supporting brake rigging, which supporting means and rigging are located outwardly from the outer side of the wheels of a vehicle.

Other objects and advantages will be apparent from the following more detailed description of the invention.

In the accompanying drawings, Fig. 1 is a plan view of a brake rigging constructed and positioned according to the invention, portions of the truck or locomotive frame being broken away to more clearly illustrate the invention; Fig. 2 is a side elevational view, on a reduced scale, of a portion of a locomotive frame and the brake rigging associated therewith; Fig. 3 is an end view of a portion of the frame and brake rigging; Figs. 4 and 5 are enlarged fragmentary cross sectional views taken on the lines 4—4 and 5—5 of Fig. 2; Figs. 6 and 7 are detail side elevational views of portions of the brake rigging; Fig. 8 is a fragmentary detail elevational view of a hanger for supporting a portion of the rigging, the view being taken in the direction indicated by the line 8—8 of Fig. 1; Fig. 9 is a plan view of a portion of the mechanism and shows a modification of a portion of the brake rigging; and Fig. 10 is a fragmentary sectional view of the same taken on the line 10—10 of Fig. 9.

In the drawings, I have illustrated my invention associated with a locomotive frame 1, which may comprise spaced side members 2 which are connected together in spaced relation with each other by the usual transversely extending frame members, only one of the side members being shown.

Each side member 2 is provided with openings 3 for the reception of the usual axle journalling means (not shown). The vehicle wheels 4, 5 and 6 are mounted on axles (not shown) in the usual manner and are located between the side members 2.

The brake rigging comprises brake or cross connector beams 7, 8 and 9, which extend transversely of the frame and which are each of such a length that they extend outwardly beyond the plane of the wheels, that is to say, they extend beyond the outer sides of the wheels.

At each side of the frame 1, the beam 7 passes between the wheels 4 and 5, and the beam 8 passes between the wheels 5 and 6, while the beam 9 is positioned beyond the wheel 6.

The beams are movably supported adjacent each of their ends from the frame by means of hanger levers 10, the upper end of each lever being pivotally connected, by a pin 11, to transversely spaced lugs 12 depending from the frame, and the lower end of each lever having a portion of the end of an adjacent beam journalled therein.

These hanger levers are located in the plane of the wheels and each has operatively connected thereto, intermediate its ends, a brake shoe head 13 carrying a brake shoe 14 for engagement with tread of an adjacent vehicle wheel.

A cross bar 15 is provided, which is located between the beam 8 and the wheels 6 and is disposed in substantially the same horizontal plane as the beam. This bar extends transversely of the frame and, at each side of the frame, passes between the vehicle wheels 5 and 6, and outwardly beyond the wheels is supported from one of the side members 2 by means of a hanger 16, which is pivotally connected at its upper end to a lug 17 depending from the underside of the side member and, at the other end, is pivotally connected with an eye-bolt 18 secured to the bar.

The brake rigging also comprises two sets of operatively connected rods and levers for actuating the beams to move the hanger levers 10 and brake heads 13 and thereby the brake shoes 14 into engagement with the vehicle wheels. One of these sets of levers and rods is located at each side of the frame 1 and is adapted to be actuated by a brake cylinder device secured to a side member 2, said brake cylinder device comprising the usual cylinder portion 19 having the usual piston (not shown) mounted therein for actuating the usual push rod 20.

Each set of levers and rods comprises a vertically disposed brake cylinder lever comprising an arm 21, a shaft 24 and an arm 26 and also comprises horizontally disposed equalizing brake levers 22 and 23.

The lower end portion of the brake cylinder lever arm 21 is secured to the outer end of the shaft 24, journalled in a bearing 25 preferably integral with a side member 2 of the frame, and the brake cylinder lever arm 26 is secured to the inner end of the shaft.

The upper end of the brake cylinder lever arm 21 is operatively connected with an extension 27 of the push rod 20 of the adjacent brake cylinder.

The horizontally disposed lever 22 is located between the beam 7 and vehicle wheel 5 and in substantially the same horizontal plane as the beam. The inner end of this lever is pivotally connected to a member 28 secured to the beam and the outer end is operatively connected to the lever 23, intermediate the ends of the lever 23, by a rod 29, said lever 23 being located on the side of the beam 8 which is adjacent the vehicle wheel 5.

Intermediate its ends, the lever 22 is operatively connected with the arm 26, secured to the shaft 24, by a rod 31, there being a suitable slack adjusting mechanism interposed between the rod and arm operable to take up slack in the rigging.

The end portion of the rod 31, which is connected to the lever 22, is preferably in the form of a jaw comprising vertically spaced jaw members 32, between which the adjacent outer end portion 33 of the beam 7 extends. Each outer end portion 33 of the beam is located in a plane outside of the plane of the adjacent vehicle wheels and is preferably of rectangular form in cross section. The end portion 33 of the beam is in supporting relation with the rod 31 and the rod is in supporting relation with the lever 22. In operating the rigging there will be relative movement between the beam and the rod 31 in directions longitudinally of the frame and to permit this movement there will, of course, be provided a slight vertical clearance between the end of the beam and the rod 31. It will here be noted that since this clearance is slight, the jaw members will serve to prevent the beam from tilting.

The equalizing lever 23 is located wholly outside of the plane of the wheel 5 and has its inner end pivotally connected to one end of a link 34, which has its other end connected to the beam 8. The outer end of the lever is operatively connected to the bar 15 by means of a link 35 comprising vertically disposed jaw members 36, between which the adjacent end 37 of the beam 8 passes, said end 37 being of rectangular form in cross section and being located in a plane outside of the plane of the adjacent vehicle wheels. The end 37 of the beam is in supporting engagement with the link 35 and through this link the outer end of the lever 23 is supported. The link 35 prevents the beam 8 from tilting in substantially the same manner as the rod 31 prevents the beam 7 from tilting.

The bar 15 is operatively connected to one of the ends 38 of the beam 9 by a rod 39, said end being of rectangular form in cross section and supporting the end of the rod 39, the connection between the rod and beam being such as to prevent the beam from tilting.

It will here be noted that the lever 23 and the connections from said lever to the beam 8 and bar 15 form a simple and effective equalizing mechanism which is very compact.

Secured to and depending from pedestal tie bars 40 at each side of the frame are safety supports 41 for the rigging. Each of these supports is secured to a tie bar 40 by nuts 42, which have screw-threaded connection with a bolt 43 mounted in the tie bar.

In Figs. 9 and 10 a modification of the connection from the lever 23 to the beam 8 is illustrated, in which a member 44 operatively connects the inner end of the lever and the adjacent end portion of the beam 8. One end of this member is provided with a jaw which is pivotally connected to the lever 23 by means of a pin 45 and the other end is loosely mounted on a round portion 46 of the beam, outward movement of the member along the beam being prevented by a cotter pin 47 mounted in the beam. In this modification the link 35 alone serves to support the lever 23 from the beam and also serves to prevent the beam from tilting.

In operation, when fluid under pressure is supplied to the cylinder portion 19 of the brake cylinder device, the brake cylinder piston moves outwardly, i. e., in the direction toward the right hand from its normal release position as shown in Figs. 1 and 2, and through the medium of the push rod 20 and its extension 27, rocks the brake cylinder lever arm 21 and thereby the shaft 24 and arm 26 in a clockwise direction. This causes the system of levers, rods, and bar 15 to function to move the beams 7, 8 and 9 to apply the brake shoes to the treads of the wheels.

In releasing the brakes, fluid under pressure is released from the brake cylinder device in the usual manner and the usual release spring (not shown) contained in the cylinder portion and which has been compressed when an application of the brakes is effected, acts to retract the piston and thereby effect the release of the brakes.

It will be understood from the foregoing description that I have provided a system of brake levers and rods which, when applied to a railway vehicle frame, will be located outside of the plane of the wheels where it will be readily accessible for inspection and repair and where it will not interfere with other working parts of the vehicle or with the assembly or inspection of said other parts. It will also be seen that I have provided a novel means for supporting said system of brake levers and rods from the vehicle frame and that I have further provided novel means whereby the beams are prevented from tilting.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a brake rigging, the combination with a truck frame and pairs of wheels carrying said frame, of two sets of operatively connected levers and rods, one set of which is located at each side of the truck frame, a beam supported from the truck frame and operable by said sets of levers and rods for applying braking force to one pair of wheels, and means carried by said beam at each end for supporting the adjacent set of levers and rods.

2. In a brake rigging, the combination with a truck frame and pairs of wheels carrying said frame, of two sets of operatively connected levers and rods, one set of which is located at each side of the truck frame, a beam supported from the truck frame and operable by said sets of levers and rods for applying braking force to one pair of wheels, and means constituting the ends of said beam supporting said sets of levers and rods.

3. In a brake rigging, the combination with a truck frame and pairs of wheels carrying said frame, of two sets of operatively connected levers and rods, one set of which is located at each side of the truck frame, a beam supported from the truck frame and operable by said sets of levers and rods for applying braking force to one pair of wheels, and means on said beam supporting said sets of levers and rods in planes outside of the planes of the wheels of said pairs of wheels.

4. In a brake rigging, the combination with a truck frame and pairs of wheels carrying said frame, of two sets of operatively connected levers and rods, one set of which is located at each side of the truck frame, a beam supported from the truck frame and operable by said sets of levers and rods for applying braking force to one pair of wheels, and an end extension on the beam located at each side of the truck frame outside of the plane of one wheel of said pair of wheels supporting the adjacent set of levers and rods.

5. In a brake rigging, the combination with a truck frame and pairs of wheels carrying said frame, of two sets of operatively connected levers and rods, one set of which is located at each side of the truck frame, and a beam supported from the truck frame and operable by said sets of levers and rods for applying braking force to one pair of wheels, said beam extending transversely of the truck frame and terminating outside of the planes of the wheels in supports for said sets of levers and rods.

6. In a brake rigging, the combination with a truck frame and pairs of wheels carrying said frame, of two sets of operatively connected levers and rods, one set of which is located at each side of the truck frame, a beam supported from the truck frame and operable by said sets of levers and rods for applying braking force to one pair of wheels, and a support on each end of the beam for supporting the adjacent set of levers and rods.

7. In a brake rigging, the combination with a truck frame and pairs of wheels carrying said frame, of two sets of operatively connected levers and rods, one set of which is located at each side of the truck frame, and a beam supported from the truck frame and operable by said sets of levers and rods for applying braking force to one pair of wheels, said beam extending transversely of the truck frame and at each end terminating in a support for the adjacent set of levers and rods.

8. In a brake rigging, the combination with a truck frame and pairs of wheels carrying said frame, of two sets of operatively connected levers and rods, one set of which is located at each side of the truck frame, a pair of hangers rockably mounted on the truck frame, each of said hangers being located at one side of the truck frame, and a brake beam extending transversely of the truck frame and carried by said hangers and operable by said sets of levers and rods, said beam extending outwardly beyond said hangers and at each end constituting a support for the adjacent set of levers and rods.

9. In a brake rigging, the combination with a truck frame and pairs of wheels carrying said frame, of two sets of operatively connected levers and rods, one set of which is located at each side of the truck frame, a pair of hangers operatively supported from the truck frame, each of said hangers being located at one side of the truck frame in the plane of one of said wheels, and a brake beam operatively carried by said hangers, each end of the brake beam extending outwardly beyond the adjacent hanger and supporting the adjacent set of levers and rods.

10. In a brake rigging, the combination with a truck frame and pairs of wheels carrying said frame, of a brake beam operatively supported from the truck frame, two sets of operatively connected brake elements for operating said beam, one of said sets of elements being located at each side of the truck frame and comprising a lever operatively connected to said beam, and a rod for actuating said lever, and an end extension on the beam in supporting engagement with said rod.

11. In a brake rigging, the combination with a truck frame and pairs of wheels carrying said frame, of a brake beam located at one side of one pair of wheels, a pair of hangers for supporting said brake beam, one of said hangers being located at each side of the truck frame in the plane of the wheels, said beam having an extension at each end located outside of the plane of an adjacent wheel, a brake element located outside of the plane of said wheel and operatively connected to and supported on the adjacent end extension of the beam.

12. In a brake rigging, the combination with a truck frame and pairs of wheels carrying said frame, of a plurality of brake beams one of which is located at one side of each pair of wheels, means for supporting said beams from said frame, two sets of operatively connected brake elements for actuating said brake beams, one set of which is located at each side of the truck frame, and means on one end of each beam in supporting engagement with the adjacent set of brake elements.

13. In a brake rigging, the combination with a truck frame and pairs of wheels carrying said frame, of a plurality of brake beams one of which is located at one side of each pair of wheels, means for supporting said beams from said frame, two sets of operatively connected brake elements for actuating said brake beams, one set of which is located at each side of the truck frame, and means on one end of each beam in supporting engagement with the adjacent set of brake elements at points located outside of the plane of the adjacent wheels.

14. In a brake rigging, the combination with a truck frame and pairs of wheels carrying said frame, of a brake beam located between two pairs of said pairs of wheels, an equalizing bar located between said two pairs of wheels and adjacent said brake beam, a brake beam located at one side of one pair of the last mentioned pairs of wheels, means at each side of the truck frame operatively connecting said bar and second mentioned brake beam, a brake lever at each side of the truck frame operatively connected to the first mentioned brake beam, a link at each side of the truck frame operatively connecting said lever to said bar, means on each end of the beam in supporting engagement with the adjacent link, and means for actuating each lever.

15. In a brake rigging, the combination with a truck frame and pairs of wheels carrying said frame, of a brake beam located between two pairs of said pairs of wheels, an equalizing bar located between said two pairs of wheels and adjacent said brake beam, a brake beam located at one side of one pair of the last mentioned pairs of wheels, means at each side of the truck frame operatively connecting said bar and second mentioned brake beam, an equalizing mechanism at each side of the truck frame operatively connecting said bar and adjacent beam, means on each end of the beam in supporting engagement with the adjacent equalizing mechanism, and means for actuating the equalizing mechanism.

16. In a brake rigging, the combination with a truck frame and pairs of wheels carrying said frame, of a brake beam located between two pairs of said pairs of wheels, an equalizing bar located between said two pairs of wheels and adjacent said brake beam, a brake beam located at one side of one pair of the last mentioned pairs of wheels, means at each side of the truck frame operatively connecting said bar and second mentioned brake beam, an equalizing mechanism at each side of the truck frame operatively connecting said bar and adjacent beam, means located outside of the plane of the wheels at each side of the truck frame and carried by said beam for supporting an adjacent equalizing mechanism, and means for actuating each equalizing mechanism.

17. In a brake rigging, the combination with a truck frame and pairs of wheels carrying said frame, of a brake beam located between two pairs of said pairs of wheels, an equalizing bar located between said two pairs of wheels and adjacent said brake beam, a brake beam located at one side of one pair of the last mentioned pairs of wheels, means at each side of the truck frame operatively connecting said bar and second mentioned brake beam, an equalizing mechanism at each side of the truck frame operatively connecting said bar and adjacent beam, means on each end of the beam in supporting engagement with an adjacent mechanism outside of the plane of the wheels at one side of the truck frame, and means at each side of the truck frame for actuating one equalizing mechanism.

18. In a brake rigging, the combination with a truck frame and a plurality of pairs of wheels supporting said truck frame, of a brake beam for each pair of wheels, and a system of operatively connected brake elements at each side of the truck frame for actuating said beams, said brake elements being supported outside of the plane of the adjacent truck wheels upon the adjacent ends of said beams.

19. In a brake rigging, the combination with a truck frame and a plurality of pairs of wheels supporting said truck frame, of a brake beam for each pair of wheels, and a system of operatively connected brake elements at each side of the truck frame for actuating said brake beams, and means on each end of each beam in supporting engagement with the adjacent system of brake elements, said means being located outside of the plane of the adjacent wheels.

20. In a brake rigging, the combination with a truck frame and a plurality of pairs of wheels supporting said truck frame, of a brake beam for each pair of wheels, and a system of operatively connected brake elements at each side of the truck frame for actuating said brake beams, and means on each end of each beam in supporting engagement with the adjacent system of brake elements, the systems of brake elements and supporting means being located in a plane outside of the planes of said wheels laterally of the truck frame.

21. In a brake rigging, the combination with a truck frame and a plurality of pairs of wheels carrying said frame, of a plurality of brake beams supported from the truck frame, one of said beams being located at one side of each pair of wheels, a bar extending transversely of the truck frame and located between two of said pairs of wheels, means at each side of the truck frame operatively connecting said bar to one of said brake beams, a system of operatively connected brake elements located at each side of the truck for actuating another of said brake beams and said bar, each system comprising a lever operatively connected at one end to the last mentioned brake beam and operatively connected at the other end to an adjacent end of said bar, a lever operatively connected at one end to another of the brake beams and at the other end operatively connected to the first mentioned lever intermediate its ends, a rod operatively connected to the second mentioned lever intermediate its ends, and means for actuating said rod and thereby the system of brake elements at one side of the truck frame.

22. In a brake rigging, the combination with a truck frame and a plurality of pairs of wheels carrying said frame, of a plurality of brake beams supported from the truck frame, one of said beams being located at one side of each pair of wheels, a bar extending transversely of the truck frame and located between two of said pairs of wheels, means at each side of the truck frame operatively connecting said bar to one of said brake beams, a system of operatively connected brake elements located at each side of the truck for actuating another of said brake beams and said bar, each system comprising a lever operatively connected at one end to the last mentioned brake beam and operatively connected at the other end to an adjacent end of said bar, a lever operatively connected at one end to another of the brake beams and at the other end operatively connected to the first mentioned lever intermediate its ends, a rod operatively connected to the second mentioned lever intermediate its ends, means for actuating said rod and thereby the system of brake elements at one side of the truck frame, and means on one end of each of two brake beams in supporting engagement with the adjacent system of brake elements.

23. In a brake rigging, the combination with a truck frame and a plurality of pairs of wheels carrying said frame, of a plurality of brake beams supported from the truck frame, one of said beams being located at one side of each pair of wheels, a bar extending transversely of the truck frame and located between two of said pairs of wheels, means at each side of the truck frame operatively connecting said bar to one of said brake beams, a system of operatively connected brake elements located at each side of the truck for actuating another of said brake beams and said bar, each system comprising a lever operatively connected at one end to another of the brake beams and operatively connected at the other end to an adjacent end of said bar, a lever operatively connected at one end to another of the brake beams and at the other end operatively connected to the first mentioned lever intermediate its ends, a rod operatively connected to the second mentioned lever intermediate its ends, means for actuating said rod and thereby the system of brake elements at one side of the truck frame, and means on one end of each of two brake beams in supporting engagment with the adjacent system of brake elements, the supporting means on the brake beams being located in a plane beyond the plane of the adjacent truck wheels.

24. In a brake rigging, the combination with a frame and a plurality of pairs of wheels carrying said frame, of a brake beam located at one side of one of said pairs of wheels, a horizontally disposed lever for actuating said beam, means for actuating said lever, and means carried by said beam and located in a plane outside of the plane of the wheels at one side of the frame for supporting the first mentioned means.

25. In a brake rigging, the combination with a frame and a plurality of pairs of wheels carrying said frame, of a brake beam located at one side of one of said pairs of wheels, means for actuating said beam, and means constituting the end of the beam in supporting relation with the first mentioned means.

26. In a brake rigging, the combination with a frame and a plurality of pairs of wheels carrying said frame, of a brake beam located at one side of one of said pairs of wheels, a horizontally disposed lever for actuating said beam, said lever being located at one side of the beam, a rod for actuating said lever, and means forming the end of said beam for supporting said rod.

27. In a brake rigging, the combination with a frame and a plurality of pairs of wheels carrying said frame, of a brake beam located at one side of one of said pairs of wheels, a horizontally disposed lever for actuating said beam, said lever being located at one side of the beam, a rod for actuating said lever and carried by the outer end of said beam, said rod cooperating with said beam to hold the beam from tilting.

28. In a brake rigging, the combination with a frame and a plurality of pairs of wheels carrying said frame, of a brake beam located at one side of one of said pairs of wheels, a horizontally disposed lever for actuating said beam, said lever being located at one side of the beam, a rod for actuating said lever and carried by the outer end of said beam, said rod cooperating with said beam to maintain the beam substantially level.

In testimony whereof I have hereunto set my hand, this 30th day of June, 1932.

THEODORE C. CROSSMAN.